United States Patent

[11] 3,568,568

| [72] | Inventor | Heinz Mahler<br>Brebbia, Italy |
|---|---|---|
| [21] | Appl. No. | 658,815 |
| [22] | Filed | Aug. 7, 1967 |
| [45] | Patented | Mar. 9, 1971 |
| [73] | Assignee | European Atomic Energy Community (Euratom)<br>Brussels, Belgium |
| [32] | Priority | Aug. 15, 1966 |
| [33] | | Germany |
| [31] | | E32288 |

[54] APPARATUS FOR MILLING AND DRILLING GROOVES OR RADIAL HOLES INTO THE INTERNAL WALLS OF TUBES
7 Claims, 7 Drawing Figs.

[52] U.S. Cl. .................................................. 90/13, 90/11, 90/62
[51] Int. Cl. ................................................... B23c 1/16
[50] Field of Search ........................................... 90/171, 13, 11.5, 11, 62, 28.1

[56] References Cited
UNITED STATES PATENTS

| 1,591,874 | 7/1926 | Moore | 90/171X |
| 1,852,601 | 4/1932 | Boyer | 90/11X |

*Primary Examiner*—Gil Weidenfeld
*Attorney*—Stevens, Davis, Miller and Mosher

ABSTRACT: An apparatus for forming grooves or holes in the internal walls of tubes comprising a means for clamping the tube, means for supporting a gauge in a predetermined relation to the tube to determine the position and configuration of the machining to be accomplished, a guide member for insertion into the tube from one end to extend lengthwise of the tube, clamping means for holding the guide member fixed within the tube, and a cutter unit insertable into the tube from the other end thereof. The cutter unit includes a guide follower for cooperation with the guide member to locate the unit radially within the tube. A radially movable cutter having means for rotating the cutter and means operable from outside of the tube to control the radial movement and hence the depth of the cut are also included in the cutter unit. A template follower, engageable with the gauge or template, determines the longitudinal and circumferential position of the cutter within the tube.

Patented March 9, 1971

INVENTOR
HEINZ MAHLER

BY Stevens, Davis, Miller & Mosher
ATTORNEYS

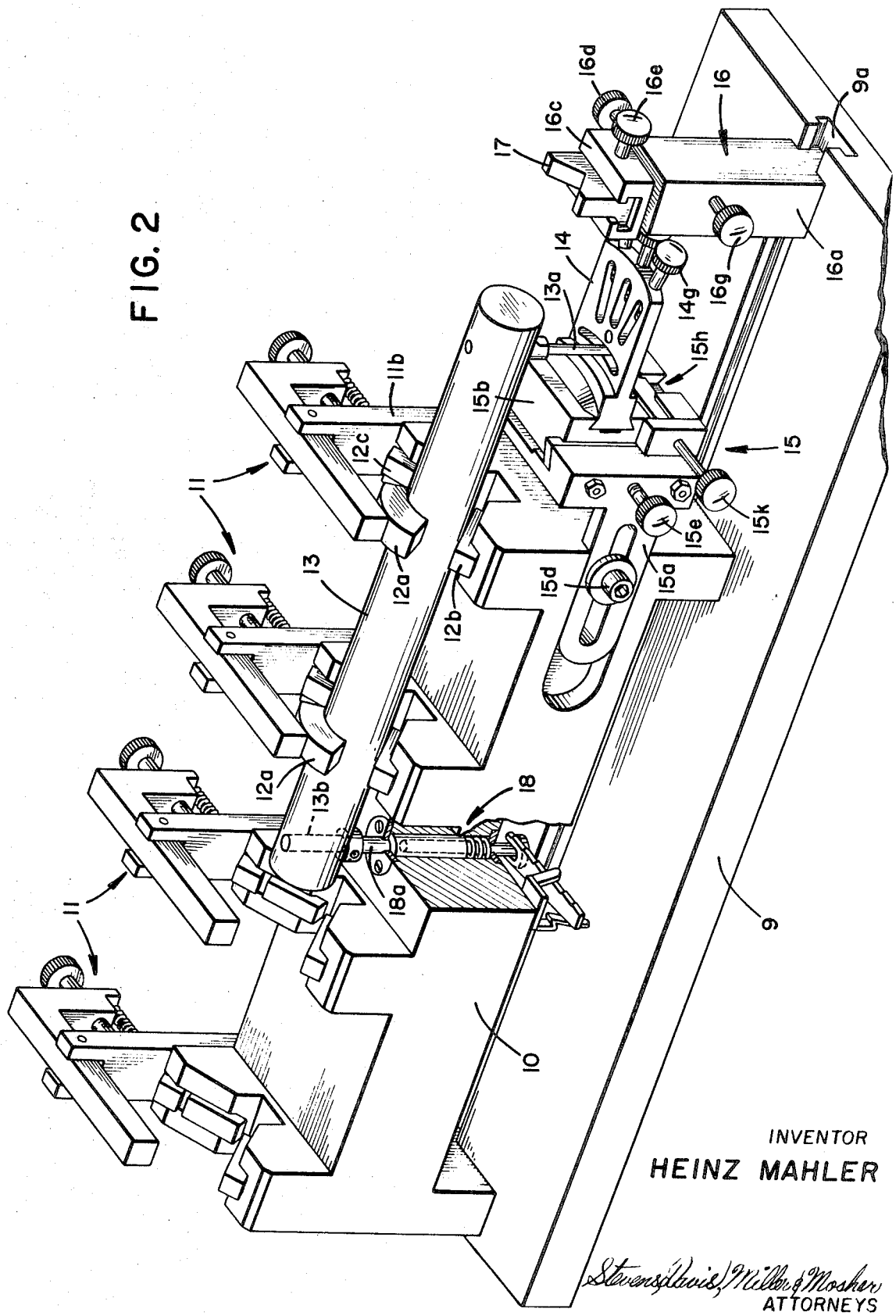

Patented March 9, 1971

INVENTOR
HEINZ MAHLER

BY Stevens, Davis, Miller & Mosher
ATTORNEYS

INVENTOR
HEINZ MAHLER

APPARATUS FOR MILLING AND DRILLING GROOVES OR RADIAL HOLES INTO THE INTERNAL WALLS OF TUBES

In the investigation of the mechanical properties of tubes (e.g. tubular casings for nuclear fuel elements or tubes for heat exchangers) it is important to determine the damaging influence on the load capacity of the tubes due to manufacturing faults on the internal walls of the said tubes. Such manufacturing faults may be surface fissures in the longitudinal and transverse directions as well as notches or radial holes or depressions. The location and extent of the surface damage is particularly important as regards the characteristics of the tubes under load if the said tubes are finned because the faults may be disposed in the zone of a fin, in the zone of a groove between the fins, or in the corner zone between groove and fin or may extend transversely across grooves and fins thus weakening the tube in different manners.

The machining apparatus according to the invention serves for the purpose of milling or drilling into the internal wall of specimens of plain or finned tubes at specified positions and with a specified depth grooves and holes, which, either simulate faults or in another context have an active function such as that of a duct for accommodating thermocouple wires, for ducting a liquid lubricant or for guiding a control element. For operation the apparatus is inserted into the tube which in turn is mounted on a setting rig.

The invention provides an apparatus for milling or drilling grooves or radial holes into the internal walls of tubes and comprises s setting jig with means for clamping a tube to be milled or drilled, means for supporting a gauge or template in predetermined relation to the clamped tube for determining the position and configuration of the groove or hole to be milled or drilled, a guide member for insertion into the tube from one end of the tube to extend lengthwise of the tube and clamping means for holding the guide member fixed within the tube and a cutter unit insertable into the tube from the other end and comprising a guide follower for cooperation with a guide member aforesaid to locate the unit radially within the tube, a radially movable cutter with means for rotating the cutter and means operable outside the tube to control the radial movement and hence the depth of cut and a template follower engageable with the gauge or template to determine the longitudinal and circumferential position of the cutter within the tube.

The invention also provides an apparatus for milling and drilling of grooves and radial holes into the internal wall of tubes, the apparatus being inserted into the internal wall of tubes, the apparatus being inserted into the tube which is clamped in a setting jig, characterized in that the apparatus is constructed in two parts of which one comprises a clamping bearing with a centering and guide pin and the other comprises a manually guided insert with centering and guide sleeve at the inner end for cooperation with the guide pin, followed transversely to the tube axis by a depth controlled turbine milling cutter and a follower pin mounted on the outer end, the said pin being arranged for engagement in a milling cutter guide template which is adjustably mounted on the setting jig.

The apparatus and the setting jig mentioned heretofore may be employed for machining a finned tube, especially a tube having axial or helical external fins. The setting jig will then be provided with a milling cutter guide template adjustable along three principal coordinate directions, and having in alignment with the said milling cutter guide template a stationary pin acting upon the finned section of the specimen tube for the rotationally correct adjustment of the specimen tube relative to the milling cutter guide template (e.g. the guide or cam recesses therein).

In the preferred embodiment of the machining apparatus a housing for the milling cutter turbine is radially slidable against the action of a return spring and is nonrotatably disposed in a corresponding chamber or recess of the insert. The insert is constructed as a tube in the zone extending from the milling cutter to the outer end (which may be formed as a handle) and supports in a longitudinal groove a slide with a cam member which acts upon the turbine housing against the action of the return spring. The aforementioned slide is provided in the zone of the outer end with a micrometer screw-thread rack by means of which it engages with a micrometer nut mounted on the outer end.

The measures described heretofore enable the milling depth to be set with an accuracy of 0.001 mm.

The apparatus in one of its forms is further characterized by the construction of the clamping bearing as a loose chuck with a stop collar to bear against the tube end or mouth, spreading bearing fingers which bear radially outwardly against the specimen tube wall, a tapered collet sleeve surrounded by the spreading fingers and containing the above-mentioned guide pin immovably and an external screw-thread on a portion of the collet sleeve and extended into a pin and screwed thereon a collet nut in free frictional engagement with the stop collar. In order to determine the moment at which the milling cutter engages the wall of the specimen tube, the tube and the insert part of the machining apparatus may be connected to a DC source with indicating instrument which indicates that the milling cutter has touched the wall when the circuit is closed due to mechanical contact of the milling cutter with the tube wall. Since the entire insert is in metallically conducting contact with the centering and guide pin of the clamping bearing it is important to prevent electrical short-circuiting of the milling cutter by the clamping bearing. To this end, the centering and guide pin is mounted in the collect sleeve so as to be electrically insulated.

An example of the machining apparatus according to the invention and the associated setting jig will now be described with reference to the accompanying drawing in which:

FIG. 2 shows a perspective view of the setting jig with a specimen tube equivalent clamped in position and serving for adjusting the milling cutter guide template.

Figure 1A:
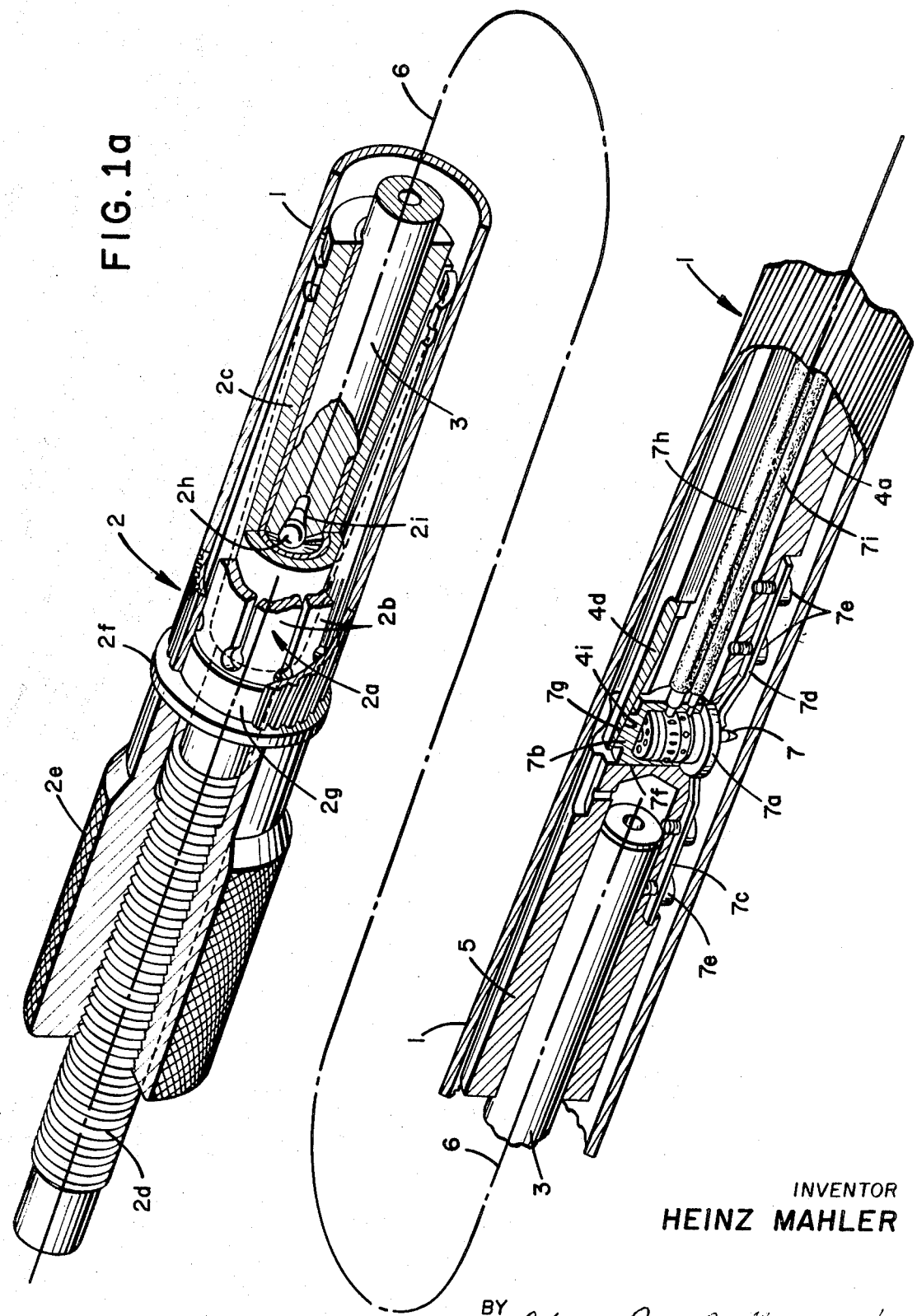
FIGS. 1a and 1b show a perspective view of the machining apparatus, partially in longitudinal section and inserted into the specimen tube to be machined which in turn is shown broken away to disclose parts of the apparatus.

In the drawings the numeral 1 refers to the finned tube to be machined consisting of Zircalloy of 24 mm. internal diameter, 28 mm. external diameter over the fins and 300 mm. length. The tube is provided on its exterior with 24 fins of 1 mm. width and 1 mm. height which extend helically in a right-hand spiral to provide one rotation on a tube length of 1200 mm. The groove width between fins is approximately 0.8 mm.

As can be seen, a machining apparatus for milling and drilling of grooves and radial holes is already inserted into the finned tube. For the machining operation the tube with the apparatus and assembled as indicated in FIG. 1 is clamped in the setting jig according to FIG. 2.

The machining apparatus according to FIG. 1 is constructed in two parts comprising respectively the clamping bearing 2 with centering and guide pin 3, and the manually guided insert 4 with centering and guide sleeve 5 at the inner end. It contains transversely to the tube axis 6 the depth controlled turbine milling cutter 7 and is provided at the outer end with a follower pin 8.

The clamping bearing comprises three loose parts, namely a chuck 2a with the six spreading fingers or tongues 2b (bearing part), a tapered collet sleeve 2c surrounded by the spreading fingers and merging at the outwardly extending end into a screw-threaded bolt 2d and a clamping nut 2e. The clamping nut bears, with freedom for rotation, against a stop collar 2f on the chuck. The stop collar in turn also bears against the end of the tube to be machined. In the zone merging from the stop collar to the spreading fingers the chuck is provided with an annular surface 2g and is provided with a stepped offset relative to the spreading fingers. This provides the necessary radial clearance to allow movement of the spreading fingers.

The centering and guide pin 3, mentioned heretofore, is firmly embedded at one end in the interior of the collet sleeve 2c. Electrically insulating material known under the trade name DEFCON is used as embedding material. A glass ball 2h at the bottom of the collet sleeve centers the pin during the embedding operation by engagement into the tapered recess 2i of the pin.

The manually guided insert 4 of the machining apparatus comprises the tubular member 4a which is hollow as far as the turbine milling cutter 7a and merges into the centering and guide sleeve 5. The tubular body is provided with a stop shoulder 4b for bearing against the setting jig and is also provided with a longitudinal groove 4c of trapezoidal section. The groove 4c extends along an envelope line from the aforementioned stop shoulder to the turbine housing 7b. A slide 4d is disposed in the longitudinal groove. The said slide is provided on its upper face in the region outside the tube with a micrometer screw-thread rack 4e. A micrometer nut 4f meshes with the rack while bearing on one side against a rib or flange 4g of the tubular member and is held on its other side by a ring 4h. Rotation of the nut causes longitudinal forward or reverse movement of the slide whose cam member 4i adjusts with its front end the depth position of the turbine milling cutter.

The turbine housing 7b is loose and bears radially adjustably upon two leaf springs 7c, 7d. The said leaf springs are secured in recesses of the tubular member 4a and of the centering and guide sleeve 5 by means of screws 7e. They are disposed to be diametrically opposite to the aforementioned slide. Furthermore, the turbine housing is nonrotatably held in a bearing chamber 7f by means of a tongue and groove engagement, not shown. On the side facing away from the milling cutter 7 the housing is provided with a cam follower 7g which is in physical contact with the cam 4i on the slide. The thrust resulting from sliding upon each other of the cam and follower causes the turbine housing (and therefore the milling cutter) to be displaced against the force (or with the force) of the leaf springs in the direction towards the internal wall of the tube to be machined (or away from it). The milling pressure and milling depth are controlled in this manner.

The milling turbine is provided with its driving means (compressed air with entrained lubricant) through delivery and discharge ducts 7h, 7i which extend through the longitudinal bore 4j of the insert.

The follower pin 8, mentioned heretofore, is clamped in the longitudinal groove 4c. The anchoring part 8a of the said pin extends radially through the insert and is screwed into the nut 8b. The follower pin 8 is embedded in the anchoring part so as to be electrically insulated.

The insert part 4 with the milling cutter of the machining apparatus as described heretofore and illustrated in the drawing can move freely longitudinally as well as in the circumferential direction (i.e. rotationally) upon the centering and guide pin 3. In order to mill the "faults" into the desired positions of the internal wall of the finned tube, the entire assembly must be mounted in the setting jig according to FIG. 2 (or a similar jig).

According to FIG. 2 the setting jig comprises a base plate 9, a clamping pedestal 10, clamping members 11 and the clamping jaws 12. The clamping members 11 and jaws 12 are of the commonly known type in which the upper jaw 12a of each clamp is movable with respect of the other jaws 12b and 12c to facilitate insertion, clamping and withdrawal of the tube. Clamping member 11 is pivotally mounted on pin 11a in member 11b and biased open by spring 11c. By means of screw 11d bearing against member 11b, the clamping member 11 is moved until the clamping jaws tightly grasp the tube. As shown in the FIG., the jig has mounted in it a solid specimen-tube gauge 13 by means of which — as already mentioned — the milling cutter guide template 14 is adjusted. The template is interchangeably mounted on the compound saddle 15 and is provided with cam recesses 14a to 14e. A further compound saddle 16 subsequently accommodates the insert end of the machining apparatus, its V-block 17 being in mechanical contact with the stop shoulder 4b of the insert.

The template saddle comprises longitudinally adjustable slides 15a (longitudinal slide), a slide 15b (vertical slide) mounted thereon to be adjustable perpendicularly thereto and a slide 15c (template slide) rotatably mounted upon the slide 15b. The milling cutter guide template is cylindrically curved in accordance with the curvature of the tube to be machined, the center of the circle of curvature being disposed on the axis of symmetry of the specimen-tube gauge. The template is mounted by means of screws upon its slide.

The longitudinal slide 15a and the vertical slide 15b of the milling cutter guide template may be locked or held by means of the adjusting screws 15d and 15e of the compound saddle. A locking mechanism of the following construction is provided for the template slide: a keyed slide 15f is guided in an annular horizontal groove 15g of the vertical slide 15b so that it bears flush upon it with its underside. The horizontal groove traverses a vertical groove 15h which extends from the lower end of the slide to the guide groove 15i of the template slide 15c, the said guide groove 15i being arcuately machined into the same slide. The mating key 15j which cooperates with the keyed slide 15f is disposed in the space between the template slide and the said keyed slide 15f. If the keyed slide is adjusted with the knurled screw 15k, the template slide (and therefore the template) may be locked or released via the mating key 15j.

The second compound saddle (V-block saddle) which supports the V-block 17 comprises a base 16a, a vertical saddle 16b and a horizontal saddle 16c. The aforementioned parts are locked or released by means of adjusting screws 16d, 16e, 16g. The adjusting screw 16g with the pinion 16h serves for adjusting the vertical saddle 16b. The pinion engages with the rack 16i of the vertical saddle. The base 16a of the V-block saddle can be longitudinally adjusted in the main groove 9a of the bottom plate of the setting jig. In the same way, the clamping pedestal 10 of the setting jig can be longitudinally adjusted in the same groove.

The cutter guiding template 14 is provided with recess cams or guides according to the kind of faults to be provided on the specimen tube. Longitudinal slits are provided for milling grooves and a hole for milling perpendicular or radial holes. The end of follower pin 8 of the insert of the machining apparatus is inserted into the aforementioned grooves or hole respectively. The recess 14a serves for milling a groove in the circumferential direction, the recess 14b for milling a radial hole, the recess 14c for milling a right-hand inclined groove, the recess 14d for milling a left-hand inclined groove and the recess 14e for milling an axially parallel groove.

To mill a right-hand or left-hand groove the appropriate recess cam is first move by appropriate rotation of the template into the plane of symmetry, that is to say below the axis. This is done by means of the specimen-tube gauge 13 and a mandrel 13a thereon. The distance between the axis of the mandrel 13a and the axis of the adjusting mandrel 18a described below corresponds to the distance between the axis of the follower pin 8 of the machining apparatus and the axis of the milling cutter 7. The appropriate length of the grooves to be milled is adjusted by knurled screws 14f, 14g and 14h of the template. These screws penetrate into recesses 14c, 14d and 14e, respectively, and thus reduce the free length of the recesses. A corresponding procedure is adopted for setting up the remaining recesses and the hole. When the template is set up, the specimen-tube gauge is unclamped from the setting jig and in its place the specimen tube with the machining apparatus is clamped in position.

As already mentioned, the faults are milled either above a groove of the finned tube, over a fin or in the zone of the edge or corner between groove and fin. The correct rotational position of the tube relative to the adjusted position of symmetry of the appropriate template recess must also be set up. This is done by means of the follower pin device 18.

In FIG. 2 the pin 18a of the adjusting means is constructed as a simple cylindrical pin which engages in a bore 13b of the specimen-tube gauge. The gauge in FIG. 2 is constructed as a smooth solid cylinder and therefore simulates a smooth tube, that is to say, without fins. The cylindrical pin in this case acts only as the reference point for setting up of the template.

Figures 1B, 3, 4, 5:
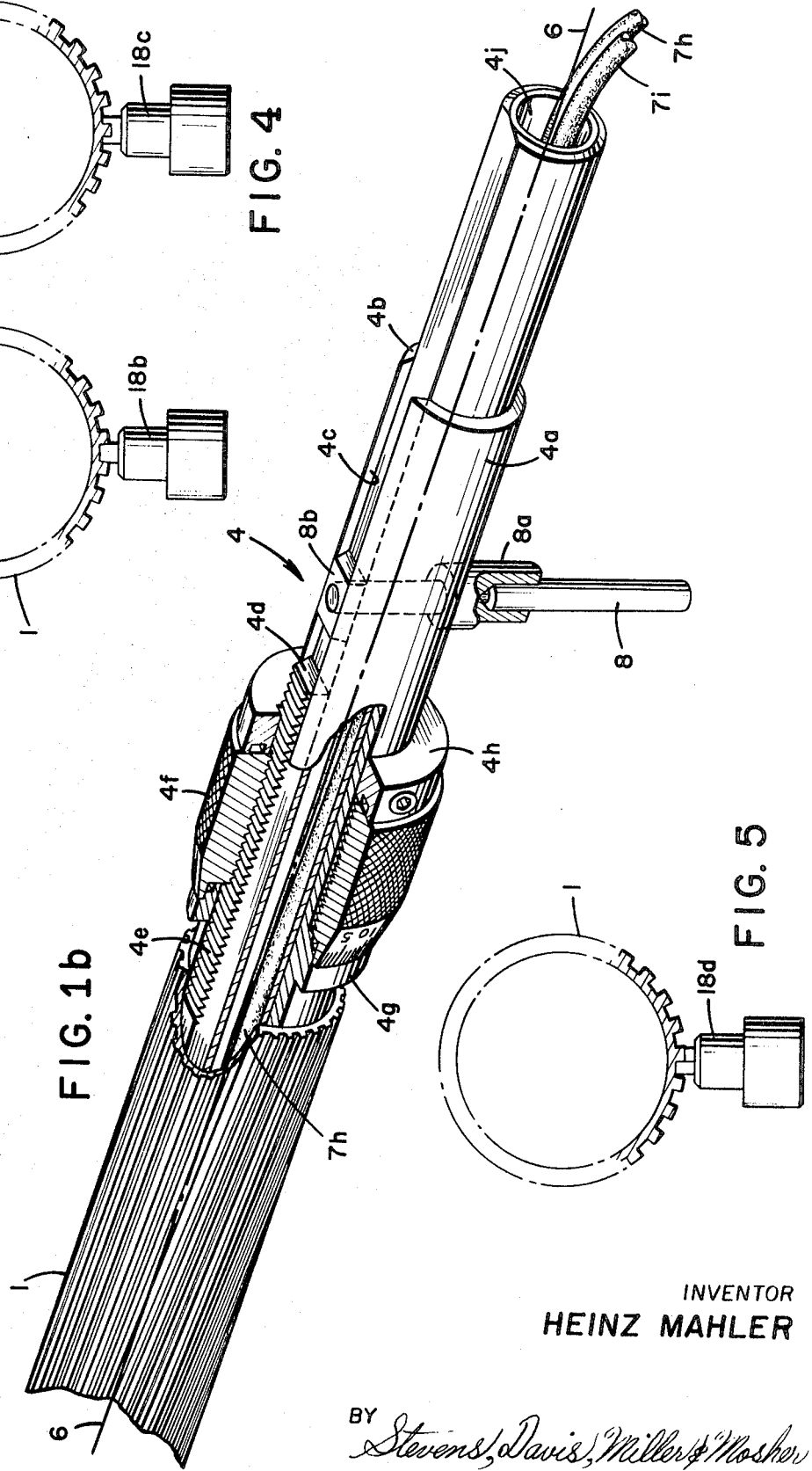
FIGS. 3 to 5 show different rotational positions of the finned tube to be machined.
Figure 6:
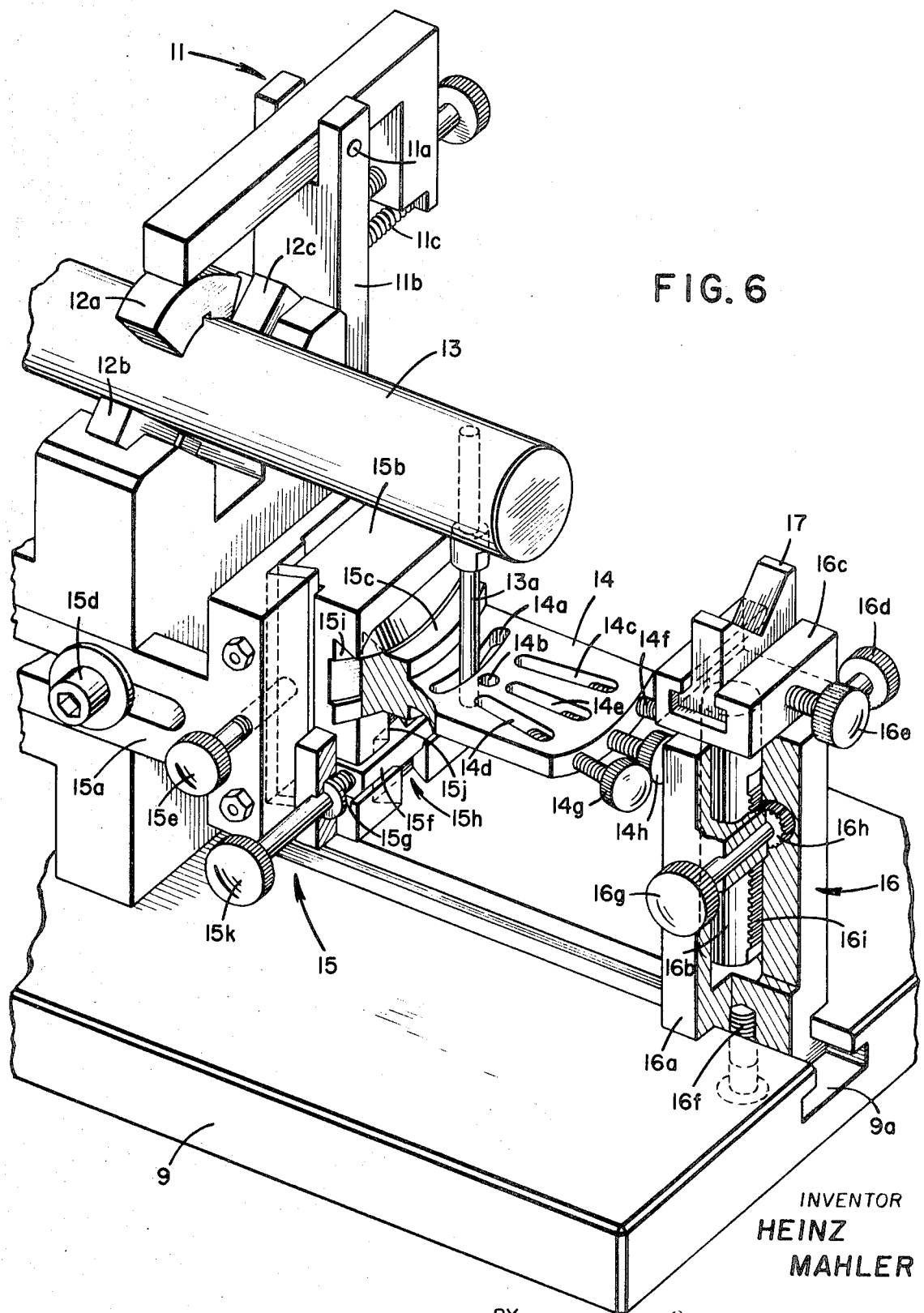
FIG. 6 shows a perspective view of the saddle end of the setting jig shown in FIG. 2, on an enlarged scale.

In the case of a finned tube the cylindrical pin 18a is unclamped after removal of the specimen-tube gauge from the setting jig and replaced by one of the adjusting pins 18b, 18c or 18d according to FIGS. 3, 4 and 5. The upper ends of the said pins are so constructed as to produce the desired relative rotational position of the tube on engaging into the grooves of the finned tube. The adjusting pins 18b, 18c and 18d differ by their shape which is adapted to the exterior fins of the tube. Assuming that the milling head has a reference position in alignment to the pin axis, it depends on the form of the pins of a groove (FIG. 3) or a fin (FIG. 4) or a transition between a groove and a fin (FIG. 5) is positioned under the head. The tube must be turned manually until the pin fits into a groove. The resultant rotation of the tube relative to the previously fixedly adjusted template amounts to half the groove width or the sum of one-half of the groove width and one-half of the fin width, depending on circumstances.

In order to determine the engagement of the milling cutter on the internal wall of the tube there is applied, via an indicating instrument (ammeter), a DC potential of a few volts between the milling cutter and the tube.

I claim:

1. An apparatus for machining internal walls of tubes comprising means for clamping the tube to be machined, gauge means, means for supporting said gauge means in predetermined relation to the clamped tube for determining the position and configuration of the machining, a guide member for insertion into said tube from one end thereof to extend lengthwise of said tube, clamping means for holding said guide member fixed within said tube, cutter unit means insertable into the other end of said tube, said cutter unit means comprising a guide follower for cooperating with said guide member to locate the cutter unit means radially within the tube, said cutter unit means including a radially movable cutter having means for rotating the cutter, and means operable from outside of the tube to control the radial movement of said cutter and hence the depth of said cut, and a template follower engageable with said gauge means to determine a longitudinal and circumferential position of the cutter within the tube.

2. An apparatus for machining the internal walls of tubes, which apparatus is inserted into the tube and said tube being clamped in a setting jig, said apparatus comprising two parts one of which comprises a clamping bearing having a centering and guide pin and means for clamping said bearing against the internal wall of the tube, the other part comprises a manually guided insert having a centering and guide sleeve the inner end of which cooperates with the guide pin, a turbine milling cutter means adjustably mounted on said other part for movement perpendicular to the tube axis, a follower pin mounted on the outer end of said sleeve, a milling cutter guide template, said follower pin engaging with said template, means adjustably mounting said template on said setting jig.

3. An apparatus according to claim 2 further comprising a housing for said milling cutter turbine means which housing is nonrotatably disposed in said manually guided insert, return spring means biasing said housing in said insert, said manually guided insert being a tubular member in a zone adjacent the milling cutter means and having a longitudinal groove at the outer end thereof, slide means including a cam member operatively mounted to act on the turbine milling cutter housing against the action of said return spring means.

4. An apparatus according to claim 3 in which said slide means is provided, in the zone of the outer end of said manually guided insert with micrometer means comprising a micrometer thread rack and a micrometer nut mounted on the opposite end in engagement with said rack.

5. An apparatus according to claim 2 in which said clamping bearing means comprises a chuck having a stop member bearing against the tube mouth, radially spreading bearing fingers, a tapered collet sleeve surrounded by the spreading fingers and immovably containing the centering and guide pin, and a screw-threaded bolt extension of the collet sleeve having a clamping nut screwed thereon and rotating freely against the stop collar.

6. An apparatus according to claim 5 in which said centering and guide pin and the follower pin are mounted on said apparatus to be electrically insulated therefrom.

7. An apparatus according to claim 2 in which said means adjustably mounting said milling cutter template is adjustable for movement in three coordinate directions, a stationary pin on said setting jig engaging in the finned profile of the specimen tube for the correct rotational adjustment of said specimen tube relative to cam profiles of the milling cutter template.